US008470411B2

(12) United States Patent
Amos et al.

(10) Patent No.: US 8,470,411 B2
(45) Date of Patent: Jun. 25, 2013

(54) LIQUID CRYSTAL ALIGNMENT LAYER

(75) Inventors: Richard M Amos, Malvern (GB); Guy P Bryan-Brown, Malvern (GB); John C Jones, Malvern (GB); Emma L Wood, Malvern (GB)

(73) Assignee: ZBD Displays Ltd., Worcestershire (GB)

( * ) Notice: Subject to any disclaimer, the term of this patent is extended or adjusted under 35 U.S.C. 154(b) by 32 days.

(21) Appl. No.: 13/086,744

(22) Filed: Apr. 14, 2011

(65) Prior Publication Data

US 2011/0194058 A1   Aug. 11, 2011

Related U.S. Application Data

(63) Continuation of application No. 12/153,059, filed on May 13, 2008, now abandoned, which is a continuation of application No. 10/531,302, filed as application No. PCT/GB03/04483 on Oct. 17, 2003, now abandoned.

(30) Foreign Application Priority Data

Oct. 17, 2002  (GB) .................................. 0224179.2
Nov. 7, 2002   (GB) .................................. 0225921.6

(51) Int. Cl.
*G02F 1/1337*   (2006.01)
(52) U.S. Cl.
USPC .............. 428/1.1; 349/123; 359/245; 428/1.2
(58) Field of Classification Search
USPC ...... 428/1.1–1.2; 349/123–136; 359/243–246
See application file for complete search history.

(56) References Cited

U.S. PATENT DOCUMENTS

| 4,521,351 | A |   | 6/1985  | Koike et al. |
|-----------|---|---|---------|--------------|
| 4,671,618 | A | * | 6/1987  | Wu et al. ........................ 349/92 |
| 4,814,257 | A | * | 3/1989  | Galloway ................. 430/270.14 |
| 4,850,682 | A |   | 7/1989  | Gerritsen ....................... 349/201 |
| 4,891,152 | A |   | 1/1990  | Miller et al. ............. 252/299.01 |
| 4,994,204 | A | * | 2/1991  | Doane et al. ............ 252/299.01 |
| 5,175,030 | A |   | 12/1992 | Lu et al. ......................... 428/30 |
| 5,299,037 | A |   | 3/1994  | Sakata ............................. 349/1 |
| 5,321,533 | A | * | 6/1994  | Kumar ........................... 349/86 |
| 5,420,233 | A |   | 5/1995  | Isogai et al. ................. 528/353 |

(Continued)

FOREIGN PATENT DOCUMENTS

| GB | 2 290 629 A | 1/1996 |
| GB | 2290629     | 1/1996 |

(Continued)

OTHER PUBLICATIONS

Patent Abstracts of Japan, JP 2001 064593 A. Mar. 13, 2001.

*Primary Examiner* — Sophie Hon
(74) *Attorney, Agent, or Firm* — Nixon & Vanderhye P.C.

(57) ABSTRACT

A photopolymer mixture is capable of use for a liquid crystal alignment layer. An alignment layer is formed from such a photopolymer mixture. The mixture comprises at least two polymerisable materials which are blended together in proportion so as to give a predetermined, preferably low, surface energy. A low surface energy, e.g., less than $4 \times 10^{-2}$ N/m, can result in an alignment layer which imparts a particular orientation to liquid crystal molecules with out requiring any post-cure treatments. The polymerisable materials may be monomers, oligomers, or diluents that form long chain molecules when cured, and the mixture may contain additives to lower the overall surface energy.

12 Claims, 4 Drawing Sheets

1 E-Mode (P polarised)

2 O-Mode (S polarised)

U.S. PATENT DOCUMENTS

Figure 1:
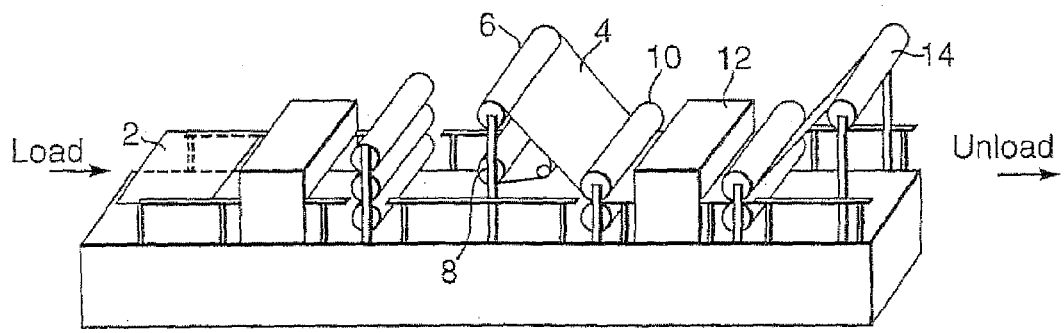

| | | | |
|---|---|---|---|
| 5,530,566 A * | 6/1996 | Kumar | 349/86 |
| 5,621,552 A * | 4/1997 | Coates et al. | 349/86 |
| 5,663,778 A | 9/1997 | Konno et al. | 349/122 |
| 5,666,217 A | 9/1997 | Kaneko et al. | 349/122 |
| 5,695,682 A * | 12/1997 | Doane et al. | 252/299.01 |
| 5,724,113 A | 3/1998 | Bryan-Brown et al. | 349/123 |
| 5,744,203 A | 4/1998 | Harada et al. | 428/1.23 |
| 5,754,264 A | 5/1998 | Bryan-Brown et al. | |
| 5,764,325 A | 6/1998 | Bryan-Brown et al. | |
| 5,795,629 A | 8/1998 | Harada et al. | 428/1.23 |
| 5,796,459 A | 8/1998 | Bryan-Brown et al. | |
| 5,844,643 A | 12/1998 | Onishi et al. | |
| 5,917,570 A | 6/1999 | Bryan-Brown et al. | |
| 5,956,112 A | 9/1999 | Fujimori et al. | 349/156 |
| 6,046,789 A * | 4/2000 | Funfschilling et al. | 349/172 |
| 6,104,448 A * | 8/2000 | Doane et al. | 349/12 |
| 6,243,063 B1 * | 6/2001 | Mayhew et al. | 345/94 |
| 6,249,332 B1 | 6/2001 | Bryan-Brown et al. | 349/129 |
| 6,559,919 B1 | 5/2003 | Tuffin | 349/172 |
| 6,587,180 B2 * | 7/2003 | Wang et al. | 349/202 |
| 6,649,230 B1 | 11/2003 | Seiberle et al. | 428/1.2 |
| 6,816,218 B1 | 11/2004 | Coates et al. | 349/123 |
| 7,053,975 B2 | 5/2006 | Wood et al. | 349/177 |
| 7,105,209 B2 | 9/2006 | Heckmeier et al. | 428/1.1 |
| 7,471,362 B1 * | 12/2008 | Jones | 349/129 |
| 2001/0005249 A1 * | 6/2001 | Stebler et al. | 349/123 |
| 2001/0007682 A1 | 7/2001 | Chiu et al. | 425/127 |
| 2002/0158574 A1 | 10/2002 | Wolk et al. | 313/504 |
| 2003/0063252 A1 | 4/2003 | Kato | 349/190 |
| 2003/0231272 A1 | 12/2003 | Nakamura et al. | 349/123 |

FOREIGN PATENT DOCUMENTS

| | | |
|---|---|---|
| GB | 2318422 | 4/1998 |
| WO | WO 97/39382 | 10/1997 |
| WO | WO 98/04953 | 2/1998 |
| WO | WO 99/18474 A1 | 4/1999 |
| WO | WO 00/59966 | 12/2000 |
| WO | WO 01/40853 A1 | 6/2001 |
| WO | WO 02/08825 A1 | 1/2002 |
| WO | WO 02/44801 A2 | 6/2002 |

* cited by examiner

1 E-Mode (P polarised)

2 O-Mode (S polarised)

LIQUID CRYSTAL ALIGNMENT LAYER

This application is a continuation of application Ser. No. 12/153,059, filed May 13, 2008, now abandoned, which application is a continuation of application Ser. No. 10/531,302 filed Apr. 14, 2005, now abandoned, which in turn is the US national phase of international application PCT/GB2003/004483 filed 17 Oct. 2003, which designated the U.S. and claims priority of GB 0224179.2, filed 17 Oct. 2002, and GB 0225921.6, filed 7 Nov. 2002, the entire contents of each of which are hereby incorporated by reference.

This technology in this application relates to photopolymers having particular characteristics, especially to photopolymers useful for forming alignment gratings for liquid crystal devices and methods for forming such alignment gratings.

Alignment layers are well known in the field of liquid crystal displays. Such alignment layers are provided on the internal surface of at least one cell wall to provide a preferential alignment to the liquid crystal material in the cell. Some alignment layers impart a particular alignment direction due to the material properties of the layer or the method of formation. Another type of alignment layer has a particular surface profile which is designed to impart particular orientations to the liquid crystal molecules.

One particular alignment layer is described in U.S. Pat. No. 6,249,332. Here is described a particular surface profile which allows the liquid crystal device to adopt any one of two stable bulk liquid crystal alignments. However surface profiles or gratings are used for a number of different types of liquid crystal display. As used herein the term grating shall be taken to mean any periodic or non periodic surface profile which is shaped so as to impart a particular alignment to liquid crystal molecules. Other examples of grating aligned liquid crystal devices can be found in U.S. Pat. No. 5,796,459, U.S. Pat. No. 5,917,570, WO 01/40853, U.S. Pat. No. 5,764,325, EP0894285 and U.S. Pat. No. 5,754,264.

One way of forming a suitable grating is to use hard contact photolithography in a deep UV photoresist material. A UV photoresist material is taken and either exposed through a mask or subjected to a particular interference pattern so as to alter the properties of part of the material in a controlled way. The exposed material is then treated so as to remove the exposed or unexposed part depending upon the material and leave the desired grating structure. Photolithography however is a relatively expensive and time consuming process.

Another known method of producing gratings is embossing. A master is used to imprint another material. For example, standard hot foil embossing or stamping techniques have been used to produce grating structures in plastic that are suitable for use as alignment layers (e.g. Lee et al., Jpn. J. Appl. Phys. Vol. 32 (1993) pp. L1436-L1438). Embossing offers the possibility of increased throughput of grating fabrication but current techniques suffer difficulties in accuracy and reproducibility.

Another embossing method involves embossing into a curable photopolymer which is then exposed to cure the material before the master is removed.

By its very nature the alignment layer has an effect on the physical, optical, electrical and chemical properties of the cell. It is therefore an object to provide an improved alignment layer material and improved grating formed from such alignment layer.

Thus, there is provided a photopolymer mixture for use in producing an alignment layer for a liquid crystal device characterised in that the photopolymer mixture comprises at least a first polymerisable material and a second polymerisable material in proportion such that the mixture has a predetermined surface energy when cured.

In the simplest form of embossing, a photopolymer is introduced onto a substrate and a master is impressed into the photopolymer. The photopolymer is then exposed to a radiation source to cure it and the resulting grating removed from the master. The adhesion properties of the photopolymer are important to control. In addition since the polymer is in contact with the liquid crystal when assembled into a cell the chemical, physical, optical and electrical properties also should be controlled.

As used herein the term photopolymer mixture means any mixture which, before curing, exhibits a viscosity which is low enough for the material to flow and which, on exposure to appropriate radiation, is cured to form a solidified polymer material. Thus for the avoidance of doubt the terms does not mean that the material must be a polymer in its uncured form but just that it is polymeric when cured. The photopolymer mixture may also be referred to simply as a photopolymer.

The term polymerisable material means any material which, on curing forms a polymeric material and includes monomers, oligomers and diluent materials, i.e. non polymer materials that have various functional groups and can bond to polymeric materials or each other to form long chain molecules.

Curing may be by optical means, including UV, visible and IR wavelengths, or by other irradiative means, including X-ray, ionic or electronic beam and thus photopolymer should be taken to include materials which are polymerised by any of these methods.

The photopolymer mixture is arranged to have a surface energy, when cured, of less than $4 \times 10^{-2}$ N/m, preferably less than $3.5 \times 10^{-2}$ N/m and may even be $2.5 \times 10^{-2}$ N/m or lower.

The surface energy of the cured photopolymer is important in that the surface energy effects not only the release of the cured film from the master, and also the adhesion to the substrate, but also in that the surface energy effects the pretilt of the liquid crystal material in an assembled device, i.e. the orientation of the liquid crystal director with respect to the local surface. Ideally the surface energy of the cured photopolymer is arranged such that when used as an alignment grating the liquid crystal material adopts the desired orientation. For instance using a photopolymer having a relatively low surface energy at the surface which contacts the liquid crystal material can ensure that in use the liquid crystal material adopts a homeotropic orientation where the liquid crystal director is locally normal to the surface. Typical grating structures where such orientation would be useful would be a zenithally bistable (ZBD) device as described in U.S. Pat. No. 6,249,332. Other devices where an alignment layer with a substantially normal orientation of the liquid crystal director to the local surface would be useful would be those described in EP0894285, a grating aligned Vertically Aligned Nematic (VAN) device or a grating aligned Hybrid Aligned Nematic (HAN) structure.

Therefore the surface energy of the photopolymer when cured is conveniently a dispersive energy of 12 mN/m-40 mN/m, even more preferably 25 mN/m-32 mN/m. The polar energy is preferably 0.0 mN/m-15 mN/m, more preferably 0.0 mN/m-10.0 mN/m, most preferably 0.0 mN/m-2.0 mN/m.

Preferably the refractive index of the photopolymer mixture is within the range 1.35 to 1.80, more preferably within the range 1.45 to 1.55. When assembled into a liquid crystal device an alignment layer formed as a grating forms an interface with the liquid crystal material which has a varying profile. The alignment grating may therefore effect the optical quality of the assembled cell. Preferably therefore the refractive index of the photopolymer material forming the alignment layer is substantially the same as the refractive index of the liquid crystal material with which it is to be used. The skilled person will appreciate that the liquid crystal material will exhibit two refractive indexes. The alignment layer is therefore preferably chosen to be substantially equal to one of the refractive indexes or some intermediate value.

The alignment layer should further have minimal optimal absorption within the visible spectrum, i.e. in the wavelength range of about 400 to 650 nm, so as to maximise brightness of the assembled display. The optical absorption is preferably less than 0.5 per micron and even more preferably less than 0.01 per micron within the visible band, for instance as measured at a wavelength of 400 nm.

Following curing the photopolymer must adhere well to the substrate material to which it is applied and yet, when used to form embossed gratings, must release cleanly from the grating master. Therefore the photopolymer is preferably adapted so as to have a higher adhesion to the substrate than the master. One way of achieving this is to ensure that the photopolymer has incompatible chemical groups to the material from which the master is formed. The photopolymer may additionally comprise an additive to aid release from the master.

The photopolymer mixture may comprise an additive to modify the surface energy of the cured photopolymer. The additive may comprise a silicone or alternatively perfluorinated or hydrocarbon alkyl chain monomers may be used. Silicones can be used to reduce surface energy and modify release from various surfaces. Suitable additives can include, for example, an acrylate or epoxy functionallized polydimethyl siloxane (PDMS) material, Alkyl (8-30 carbon chain) acrylates/epoxies/vinyls and fluoro- or perfluoro-alkyl (3-30 carbons) acrylates/epoxies.

For photopolymers which are to be used to produce embossed alignment gratings the viscosity is important in that the viscosity of the uncured photopolymer determines the thickness of the embossed film for a given set of embossing parameters, such as pressure and speed, and ultimately determines the throughput of the embossing step, which affects manufacturing cost. Preferably the viscosity of the uncured photopolymer mixture is within the range 5 cP (centiPoise) to 10 P (Poise), more preferably in the range 40 cP-500 cP or less than 200 cP.

Photopolymers generally shrink on curing. Shrinkage however reduces the amplitude of the embossed grating compared to that of the master, may be non-uniform across the layer and may distort the shape of the grating grooves. Preferably therefore the degree of shrinkage on cure is less than 20%, more preferably less than 10% and in some cases less than 3%.

The photopolymer preferably has a polymerisation speed such that an exposure dose of less than 2 J/cm$^2$ is required more preferably less than 100 mJ/cm$^2$.

The cured photopolymer film should be non-soluble in the liquid crystal material and also preferably is non-soluble in isopropanol and acetone as the film typically has to survive several solvent washes.

It has been known that in use ions in the alignment layer may leech into the liquid crystal material affecting electrical switching characteristics. The photopolymer should therefore have a minimal ionic content. Metallo-organic compounds could be added to the photopolymer to prevent ions leeching. The metallo-organic compounds could effectively 'cage' any ions within the photopolymer.

In use the electrodes supplying voltage to the liquid crystal cell supply voltage across the alignment layer as well. Any drop in voltage across the alignment layer results in the required driving voltages to be increased to compensate. It is therefore preferable that the photopolymer has a high dielectric constant when cured so as to reduce voltage drop. Preferably the relative permittivity of the cured photopolymer is in the range of 2-50, more preferably 4-20.

At least one of the two short chain polymerisable materials may be a monomer and at least one of the short chain polymerisable materials may be an oligomer. Monomers content decreases viscosity of the photopolymer and increases shrinkage. Oligomer content decreases shrinkage but increases viscosity and to a large extent controls the physical properties. Therefore careful control of the proportion of oligomer to monomer can control the viscosity and shrinkage of the material. Choice of non-ionic materials with a high dielectric constant allows gratings which do not detract from the switching properties of the liquid crystal cells. Monomer and oligomer materials are available in a range of refractive indexes and again the proportion of each can be chosen to provide a refractive index which substantially matches that of the liquid crystal material being used.

One or both of the polymerisable materials may be diluent materials, i.e. materials that are not polymeric themselves but may have one or more functional groups and join with another polymerisable material or from long chain molecules.

Additives may be added to the mixture in order to control the surface energy and can also modify the viscosity of the uncured photopolymer. The additives may comprise materials which are not polymerisable, including photo-initiators and stabilisers.

The photopolymer may also comprise immiscible components, either in solid or liquid form, or both, i.e. components which do not mix into the rest of the photopolymer mixture. This may help control the mechanical, electrical or optical properties of the photo-polymer layer. One advantage that the inventors have found to be particularly useful from the inclusion of an immiscible component is the effect on domain nucleated devices, such as the ZBD of U.S. Pat. No. 6,249,332, The immiscible components give rise to nucleation and domain pinning sites in a similar fashion to that described in WO98/04953 for a ferroelectric liquid crystal. The effect of this on a ZBD device is to increase the operating range for addressing the two stable states, improving mechanical stability of a displayed image and the operable temperature range and reducing unwanted growth of the opposite state after the device has been latched into the desired state. The immiscible component may comprise polymerisable materials, for example alkyl with perfluoro, ketones or expoxies, insulating solid particulate materials, for example silicones or silicates, or conducting solid particulates such as C60 balls and tubes, ITO or metal particulates.

Nucleation and domain pinning sites may also be produced in the photopolymer by controlled polymerisation, for example using a multi-step curing process. An example of such a method would use a first step in which polymerisation occurs earlier and more rapidly in certain parts of the photopolymer, followed by a second step where the bulk of the sample is cured when in contact with a master grating, say a shaped shim. For example, the first cure can be made to introduce particulate of cured photopolymer in an uncured matrix, for example by exposing through a mask containing random transmissive dots. The layer is then embossed using a shim of the required shape and is exposed uniformly over the required area to cure the polymer. After removal of the shim (e.g. de-lamination) the resulting grating has a roughened structure wherein the lengthscale of the local roughness is typically lower than that that can be produced in the original photolithography used to create the shim.

Adding an immiscible component destroys the uniformity of the cured photopolymer when cured resulting in parts of the alignment layer having different properties. This can offer a number of advantages. For instance a local difference in electric permittivity would, in use, create local field hotspots for nucleation of a switched state.

The surface affinity properties would also change. Where the photopolymer is treated with a surfactant after curing the density of the surfactant may then vary over a microscopic length scale. The surface roughness induced by having immiscible components would provide topographic pinning sites for domains in a bistable cell on length scales far below the pitch of the grating, i.e. less than 100 nm.

There is also the possibility of changing the optical properties of the alignment layer using immiscible components which offers the potential for changing white balance, diffuser and grating combinations. Of course the immiscible component could be index matched to the photopolymer matrix and liquid crystal material if preferred to take advantage of the ability of index matching the alignment layer and liquid crystal material.

Advantageously the photopolymer mixture may be adapted such that on curing it forms an alignment layer having a surface energy which varies from the surface designed to contact the liquid crystal material to the surface in contact with the substrate. For instance it may be desired that that surface that contacts the liquid crystal material has a low surface energy so as to impart a homeotropic orientation to the liquid crystal materials in use whereas to ensure good adhesion with the substrate the surface energy of the other surface is higher.

One way of achieving this is for the photopolymer mixture to comprise a component having a low surface energy and vary the concentration of this component throughout the thickness of the cured layer.

If the photopolymer material is embossed prior to curing to form an alignment grating and the master used for embossing has a low surface energy then the low surface energy component will tend to migrate to the embossed surface to minimise the interfacial free energy. If the photopolymer is cured after this migration has occurred to at least a partial extent the cured film will have a concentration gradient of low surface energy material and hence different surface energies at its different faces.

Alternatively a multi step cure process could be used. For example, the photopolymer may be formed from a series of polymerisable components that form the majority of the formulation that cure at a first wavelength at a given rate. The photopolymer may also contain a second set of components that lead to a low surface energy that cure at a second wavelength and rate. The components are designed so that the photopolymer strongly absorbs one of the two wavelengths.

For example, a photopolymer is formulated with higher surface-energy components that polymerise when exposed to wavelength $\lambda 1$ and lower surface-energy components that polymerise when exposed to wavelength $\lambda 2$, such that the higher surface-energy components (which form the majority of the formulation) strongly absorb $\lambda 2$. This photopolymer is initially flexo-printed onto the glass substrate comprising an electrode. A shim, for example formed from a plastic sheet, with the inverse of the required surface relief pattern and formed from a material that transmits both wavelengths $\lambda 1$ and $\lambda 2$ is then pressed into the photopolymer. The photopolymer being liquid, flows around the shim to form the required shape. The photopolymer is then exposed to illumination of $\lambda 2$ through the shim for a given duration. This begins to cross link the minority, low surface energy components of the photopolymer mixture, leading to a higher concentration of these components at the top surface (ie the surface in contact with the shim), provided that this first wavelength is sufficiently absorbed strongly by the majority (higher surface energy) components of the photopolymer, i.e. as $\lambda 2$ cannot penetrate far into the photopolymer it is only at the top surface that it will cause polymerisation of the low surface energy component and this localised polymerisation will draw more low energy component out of the bulk liquid. This process may be helped using a post-exposure bake, in which the temperature of the photopolymer mixture is raised to allow further diffusion of the low surface energy components to the upper surface. Following this procedure, the substrate is exposed to $\lambda 1$ to cure the remainder of the photopolymer. Once fully cured, the shim is removed and may be ready for use as a homeotropic grating liquid crystal alignment layer, perhaps after an additional bake (eg at 150° C. for 1 hour).

It will be apparent to one skilled in the art that this method may be designed such that exposure is applied through the bottom substrate to give the same desired concentration gradient, or using separate exposures through the shim and the substrate.

Such a concentration gradient may also be created by combining thermal and UV curing mechanisms. For example, the majority of the fixable polymer could be formed from epoxy monomers which polymerise after baking when in the presence suitable thermal acid generators. To this is added an low-energy monomer that polymerises when exposed to a suitable UV wavelength (e.g. an acrylate monomer and photo-initiator sensitive to 365 nm). To ensure strong absorption by the bulk of the monomer, a suitable dye (such as Alizarin Yellow GG) may also be added to the polymer mixture. An example process is as follows. The fixable-polymer is flexo-printed onto the substrate to the required thickness and the shim pressed into contact to ensure the correct shape is imposed into the material. The fixable polymer is exposed to 365 nm of an appropriate dosage, through the structured shim for a suitable duration (typically 20 seconds). This causes cross-linking of the lower energy components (e.g. the acrylated surfactant monomers) at the upper surface in contact with the shim. Whilst still in contact with the shim, the polymer is then baked to fully cure the remaining material before removing the shim.

The grating coated substrate is then ready for use as a zenithally bistable surface without further treatment. This dramatically reduces the number of steps in a commercial process since surface coating and selective removal are then no longer required. Note also that an additional advantage of creating the phase separation of the lower energy components is that it helps physical separation of the shim. For example, this may allow a plastic shim to be used on several occasions without physical damage occurring in the de-lamination process.

Another route to create such a concentration gradient is to use components in the fixable polymer that cure at different rates. For example, if the lower surface-energy components that form the majority of the fixable polymer cure at a faster rate to the low surface energy additive(s). The concentration gradient may be controlled such that all the profiled surface has substantially the same surface energy or the surface energy could be varied along the profile.

The surface energy must be less than $4 \times 10^{-2}$ N/m, preferably less than $3.5 \times 10^{-2}$ N/m, with good behaviour having been observed by the present inventors with surface energies of about $2.5 \times 10^{-2}$ N/m or lower.

In another aspect there is provided a photopolymer mixture comprising a first component and a second component together being capable of cured to form a polymeric material having a predetermined surface energy. Thus the mixture of two components which together can polymerise to form a long chain molecule can have the same advantages as described with respect to the first aspect.

In another aspect there is provided an alignment layer for a liquid crystal material, the alignment layer having a surface profile and comprising a polymerised photopolymer characterised in that the photopolymer is the photopolymer according to the first or second aspects.

The alignment layer may be disposed on a substrate and have a surface energy at the surface in contact with the substrate which is higher than the surface energy on the surface which will contact the liquid crystal material. As mentioned a low surface energy at the liquid crystal side of the alignment layer can lead to an alignment layer with the right alignment properties but a relatively higher surface energy is preferred at the substrate side to provide good adhesion.

In a further aspect there is provided a method of making an alignment layer for a liquid crystal material comprising the steps of;
i) taking a photopolymer,
ii) introducing the photopolymer to a substrate,
iii) taking a master bearing an inverse of the desired grating and impressing it into the photopolymer on the substrate,
iv) curing the photopolymer on the substrate, and
v) removing the master from the cured photopolymer characterised in that the photopolymer comprises the photopolymer according to the first aspect.

The viscosity and refractive index are preferably in the ranges described with reference to the first aspect.

Conveniently the first short chain material is an oligomer or diluent. The second short chain material may be a monomer or diluent. The photopolymer may also comprise an additive, the proportion or additive and first and second polymerisable material being such that the photopolymer has a predetermined surface energy. Preferably the surface energy is such so as to impart, in use, a particular alignment to a liquid crystal material. That alignment is preferably a homeotropic alignment.

In yet another aspect there is provided a liquid crystal cell comprising a liquid crystal material located between two cell walls, at least one cell wall bearing an alignment layer according to the previous aspect. Ideally the refractive index of the alignment layer is substantially equal to the refractive index of the liquid crystal material.

Figure 2:
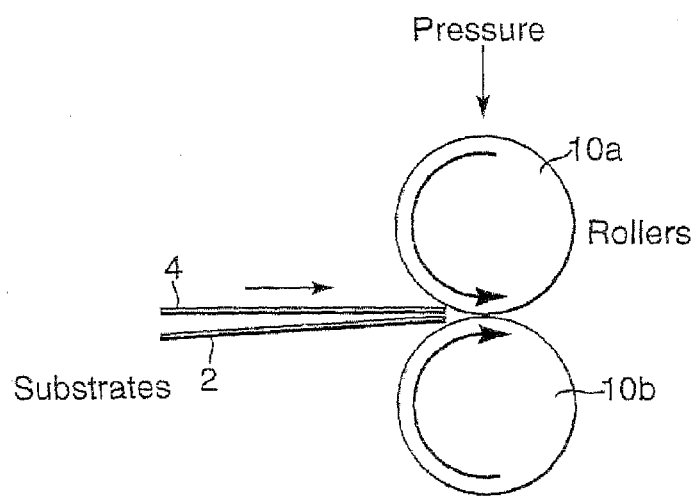
Figure 3:
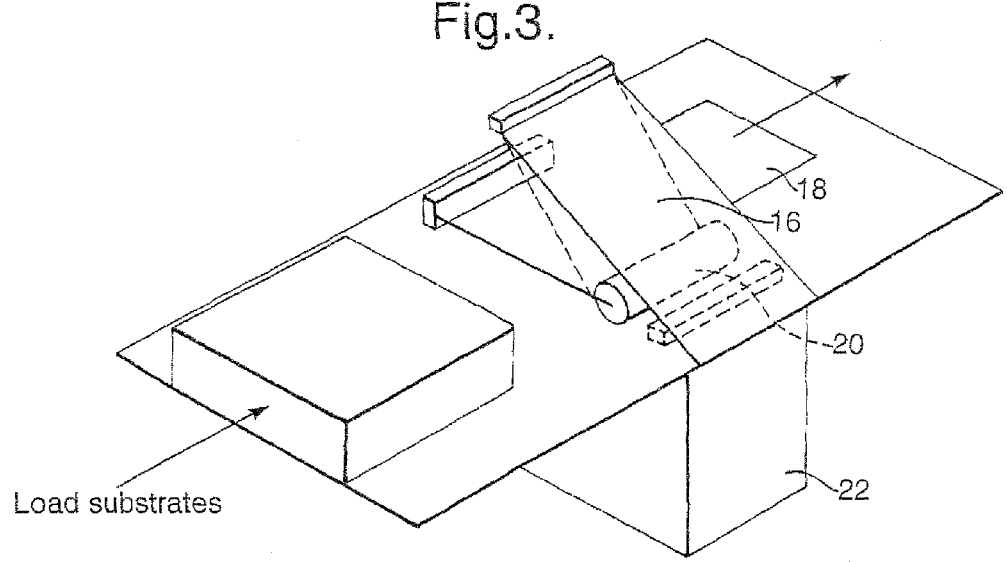
Figure 4A:
Figure 4B:
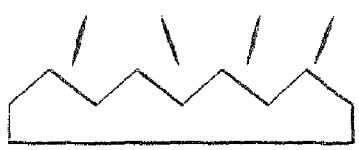
Figure 5:
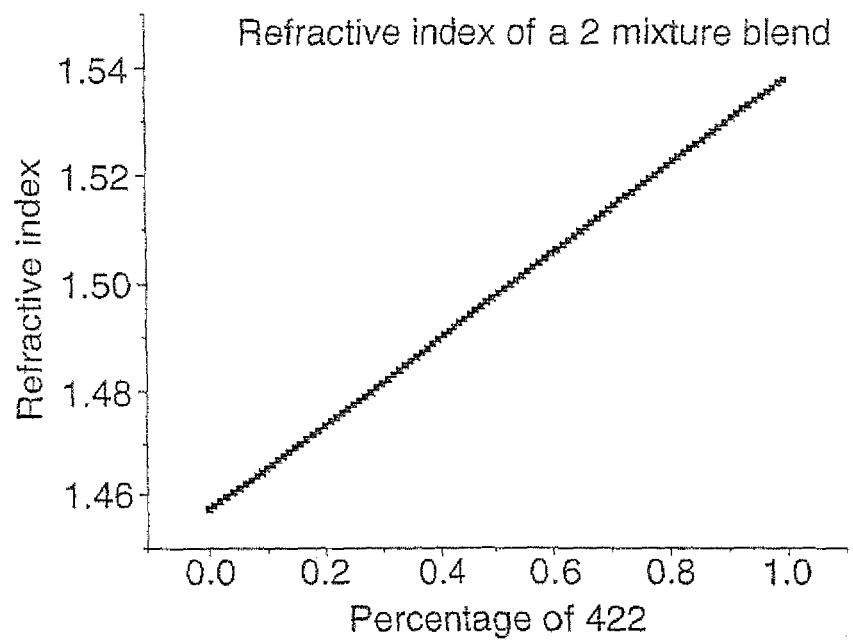
Figure 6:
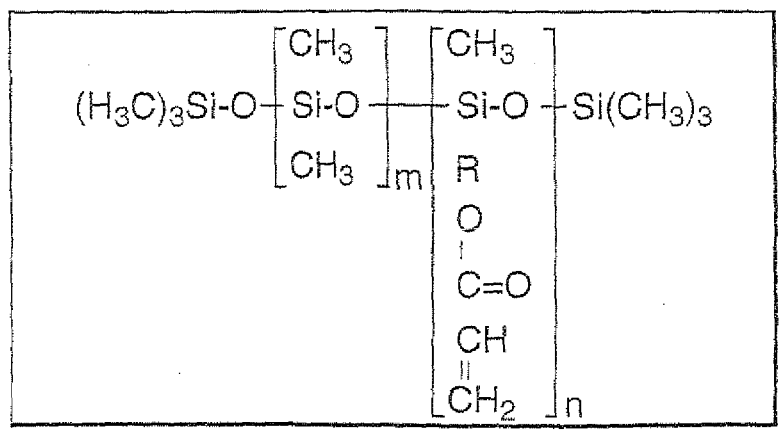
Figure 7:
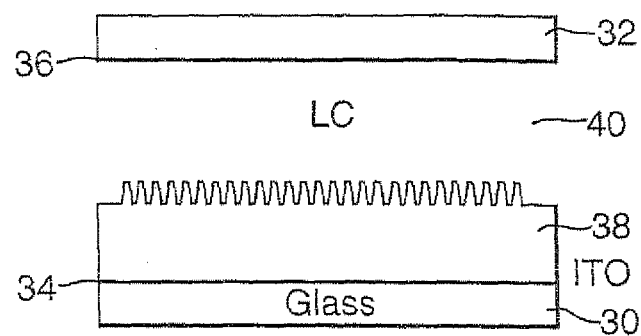
Figure 8:
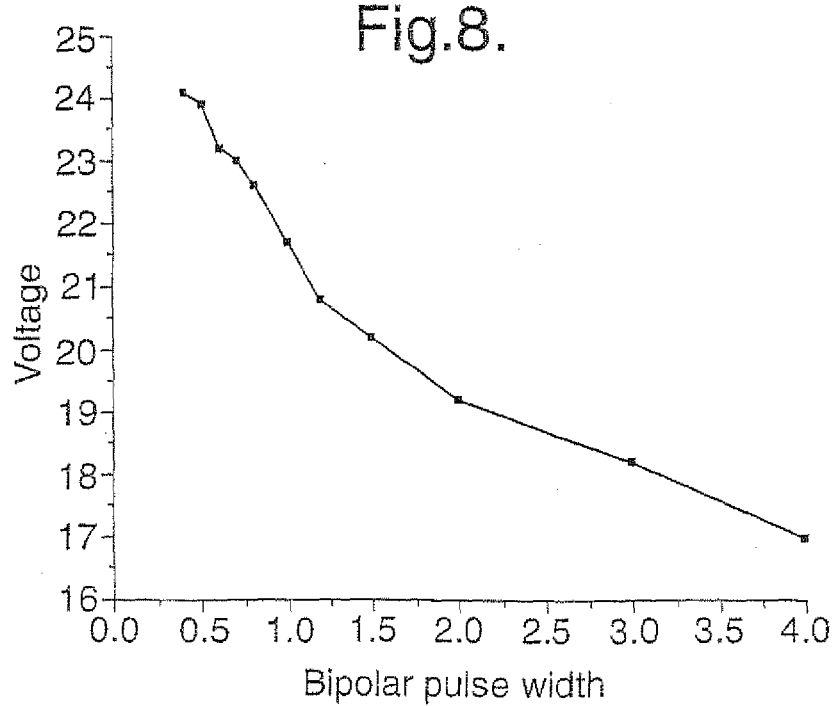

FIG. 1 illustrates an apparatus for embossing a photopolymer on a glass substrate using a carrier film as a master, FIG. 2 shows the detail of how the carrier film and photopolymer bearing substrate are brought together, FIG. 3 shows an apparatus for embossing a photopolymer on a glass substrate using a flexible shim, FIG. 4 shows two possible polarisation orientations for a ZBD cell, FIG. 5 shows the refractive index as a function of concentration for two actilane monomers, FIG. 6 shows an examples of a silicon acrylate that could be used as a suitable additive, FIG. 7 shows a schematic of a ZBD cell with an embossed grating, FIG. 8 shows the voltage to switch between the two stable states as a function of bipolar pulse width for a ZBD cell with an embossed grating.

Embossing of liquid crystal alignment layers offers a simpler and higher throughput method of manufacture than existing methods. A master grating is used to emboss a photopolymer, such as a UV curable photopolymer, which is printed or nip fed onto a substrate which may be glass. The master grating may be formed on a nickel shim. Alternatively another film may have been imprinted to act as a carrier film bearing the master grating. Pressure is applied to the carrier film or shim such that the photopolymer flows and forms a film of around 1-1.5 µm. The photopolymer is exposed to UV light which causes it to solidify. The carrier film or shim is then removed from the glass leaving behind the textured polymer film.

An apparatus for embossing a photopolymer onto a glass substrate using a carrier film is shown in FIG. 1. The glass substrate 2 is loaded from the left as shown in the figure. The photopolymer is either pre-printed on the substrate 2 or may be applied prior to the substrate reaching rollers 10. A carrier film master 4 is stored on roll 6. The carrier film has a protective covering which is removed onto roll 8 to expose the master grating. The carrier film is brought into contact with the substrate 2 and pressure applied thereto by rollers 10. This is shown in greater detail in FIG. 2 which illustrates the principle. The substrate 2 bearing the photopolymer is brought into contact with the carrier film 4 (in reality the carrier film 4 would wrap partly around top roller 10a. The carrier film 4 and glass substrate 2 pass through the rollers 10 and pressure is applied. The rollers may be a hard rubber and the pressure could result from the elasticity of the rollers or metal rollers could be used and a certain amount of pressure applied.

Referring back to FIG. 1 the pressed carrier film and substrate are passed through a UV lamp 12 for curing. After curing the carrier film is removed from the substrate and taken onto roll 14.

FIG. 3 shows an alternative embossing apparatus where a flexible nickel shim 16 bearing a master is pressed onto a photopolymer bearing substrate 18 and pressure applied via moveable roller 20 before the photopolymer is cured by UV lamp 22.

As mentioned in such embossing methods the photopolymer should adhere well to the glass, or ITO if an electrode is laid down on the glass, yet release cleanly from the carrier film or shim. In addition as the polymer is in contact with the liquid crystal material within the assembled cell the chemical, physical, optical and electrical properties are crucial properties to control. Important properties include Release from the carrier film/shim but good adhesion to the substrate such as glass/ITO or plastic/ITO, suitable plastic including, for example, PES (Polyethersulphone) and PET (polyethylterapthalate).
Refractive index
Optical absorption/coloration
Surface Energy
Ability to be post treated with a surfactant (e.g. silane or alcohol treatment)
Viscosity
Polymerization speed
Shrinkage
Ionic content
Dielectric permittivity
Low odour and toxicity Whilst some photopolymers are known that may for instance have the same refractive index as a liquid crystal material to be used they do not posses low viscosity and the correct surface energy to align the liquid crystal material. The present inventors realized that these properties can be controlled by blending combinations of monomers, oligomers, diluents and additives to control the properties of the composite polymer. Monomer content decreases viscosity but increases shrinkage. Oligomer content decreases shrinkage but increases viscosity and to a large extent controls the physical properties. All are readily available in a variety of refractive indexes. The mix can also be arranged to be optically clear and show little or no absorption in the visible region of the spectrum.

In order to test refractive index matching a sample was prepared and compared with a grating produced using a photoresist method.

A master was made by first coating an ITO coated glass substrate with photoresist UVIII, a deep UV photoresist. This was achieved by spin coating at 1100 rpm in a gyroset spin coater. After a suitable soft bake to remove solvent it was placed in hard contact with a chrome on glass mask and exposed to collimated UV light for 9 seconds. The chrome on glass mask consisted of 0.35 micron chrome lines with a repeat period of 1 micron. After an activation bake the resist was developed and washed with de-ionised water. It was then exposed in an EPROM eraser and baked in a vacuum oven for 2.5 hours at 173 degrees. The surface was then treated with a fluorinated polymer called CYTOP. This was spin coated at 3000 rpm at a dilution of 1:3 in perfluorotributylamine. The substrate had a further 1 hour bake at 160 degrees.

The master formed was a grating suitable to imprint a zenithal bistable grating to the photopolymer as described in U.S. Pat. No. 6,249,332. Thus the assembled cell was a Zenithal Bistable Liquid Crystal Device.

The substrate consisted of an ITO coated 0.55 mm thick glass substrate. This was cleaned with solvents and placed in a UV Ozone chamber for 10 minute to render the surface high energy. Small drops of photopolymer were placed on the substrate and the master placed on top. The laminate was then passed between a pair of soft rollers. The shore hardness of the rollers was shore hardness 'D' (for example D65). The compression of the rollers was 1.8 mm and the speed was 2 mm/sec. The laminate was then cured under a UV lamp and separation was achieved by peeling away the master with a blade. Cells were made by treating the photopolymer and assembling against a rubbed poly-imide substrate. They were filled with liquid crystal material MLC6204-000.

In order to maintain maximum brightness of the display the optical absorption of the grating polymer should be minimised. In addition it is desirable to reduce/remove diffraction effects in the reflected (undiffracted beam). In the assembled cell two configurations are possible for the orientation of the polariser which is adjacent the grating surface. These two configurations are shown in FIG. 4.

In the configuration shown in FIG. 4a the input polarisation samples both the extraordinary and ordinary refractive indexes ($n_e$ and $n_o$) of the liquid crystal which cannot both be matched to the refractive index of the grating polymer ($n_p$). Hence the grating/liquid crystal interface can never be optically buried and diffraction will always exist. In the configuration shown in FIG. 4b the input polarisation samples only $n_o$ of the liquid crystal and so the grating diffraction can be removed completely (at normal incidence) when $n_p=n_o$. Furthermore this matching condition is retained for both the defect and non-defect states. For off axis viewing, the diffraction will start to appear in the plane parallel the groove direction but will remain zero for the orthogonal plane.

Reflectivity data was taken on an Eldim Ezcontrast 160R machine. Two cells were examined, one where the grating was made in photoresist, the other where the grating was made by embossing into a silicone hard coat material (GE Silicones UVHC 8556). The reflectivity data is shown in table 1 and the refractive index in table 2.

TABLE 1

| Front Polariser | Back Polariser | Grating polymer | Mode | Reflectivity | Contrast |
|---|---|---|---|---|---|
| HEG1425DUHCARS | TDF | UVIII | o | 0.315 | 14.1 |
| HEG1425DUHCARS | TDF | Embossed | o | 0.330 | >20 |

TABLE 2

| Material Name | Material Type | n (589 nm) |
|---|---|---|
| Shipley UVIII | Polyhydroxylstyrene photoresist | 1.641 |
| GE UVHC8556 | Acrylate silicone photopolymer | 1.514 |

The refractive index of the liquid crystal material MLC6204-000 is 1.504. The results above show that the reflectivity and contrast is improved for the embossed cell due to the fact that the refractive index is closer to $n_o$ compared to resist. This decreases diffractive losses within the cell.

The refractive index can be controlled by mixing, for example, two components that have different refractive indexes. The refractive index of the mixture is a linear weighting of the percentage of each material. For example, uncured monomer actilane 420 has n=1.537, and uncured actilane 425, n=1.457. A blend of 59% actilane 420 and 41% actilane 425 would have a refractive index of 1.504. FIG. 5 shows the refractive index of the mixture as a function of composition. The actual refractive index of the cured photopolymer may vary slightly, for instance it may be approximately 1% higher but this may depend on the extent of shrinkage. The viscosity of the mixture can be controlled in a similar fashion (different functional dependence on concentration).

The viscosity determines the thickness of the embossed film for a given set of embossing parameters such as pressure and speed and ultimately determines the throughput of the embossing step which affects manufacturing cost. The viscosity is therefore chosen ideally to be between 40 and 500 centipoise.

The photopolymer must exhibit excellent release from a carrier film or a flexible shim (nickel or polymer) but show excellent adhesion to glass and ITO. This is critical to achieving a good fidelity copy of surface profile from the carrier film or shim on the glass substrate. There are two (or more) approaches. The first is to ensure that the carrier film or shim has a low surface energy (to form a non stick coating). The second is to ensure that the photopolymer and the carrier film or shim have incompatible chemical groups at their surface. Likely carrier film or shim material are;

Polycarbonate
Polypropylene
Polyethylene
Polyester
PMMA
Nickel
Hot foil polymer
UV Lacquers Silicones can be used as an additive to reduce viscosity and modify release from various surfaces. They can be, for example, an acrylate or epoxy functionallized polydimethyl siloxane (PDMS) material. If used as part of a blend with monofunctional or bifunctional acrylate monomer, for example, they migrate to the interface and cause the cured film to be lower in surface energy.

One example of a suitable silicone acrylate is shown in FIG. 6.

The surface energy of the photopolymer is important. Grating shape does provide alignment of the liquid crystal material but it is also necessary for the alignment layer to provide either a planar alignment or a particular homeotropic alignment to the liquid crystal material. In a particularly advantageous arrangement of ZBD cell it is desired to have homeotropic alignment of the liquid crystal material adjacent the alignment layer. The surface energy of the grating is important in effecting how the liquid crystal material aligns and a homeotropic alignment requires a relatively low energy. Having the alignment layer with inherently the right surface energy means that no post processing of the alignment layer is required. This reduces the number of manufacturing steps and thus increases efficiency. Further with no need to add a surfactant the problems of uneven spread of surfactant on an uneven surface are avoided and the grating shape is preserved.

As the skilled person will be aware the surface energy can be measured in terms of the polar and dispersive components. Examples of correct polar and dispersive components are;

$\gamma_p$=8.6 mN/m and $\gamma_d$=15.7 mN/m
$\gamma_p$=0.8 mN/m and $\gamma_d$=25.1 mN/m
$\gamma_p$=9.9 mN/m and $\gamma_d$=14.8 mN/m FIG. 7 shows a schematic of a zenithal bistable liquid crystal cell. Two glass substrates 30, 32 each carry ITO electrode 34, 36. One substrate 30 also carries an embossed grating 38. Liquid crystal material 40 is introduced into the cell gap. In operation a voltage is supplied across the liquid crystal material 40 by the electrodes 34, 36. Appropriate voltage pulses can cause the liquid crystal material to adopt any of the two stable states which can then be maintained in the absence of power. The voltage required to address a liquid crystal cell is important for virtually all liquid crystal cells. Bistable cells are often used in portable appliances however to preserve battery life due to the fact that they do not need constant addressing. In some applications power consumption is critical and it is desired to have low addressing voltages.

As can be seen from FIG. 7 when a voltage is applied between the electrodes 34, 36 some voltage will drop across the liquid crystal material 40 and some across the grating 38. A certain voltage will be required to switch the liquid crystal material depending on the cell design. Any voltage dropped across the grating simply adds to the voltage which must be applied across the electrodes.

There are two ways to minimize the voltage dropped across the grating. First the total polymer thickness of the grating layer should be minimized. This is controlled by ensuring an appropriate viscosity of the photopolymer and a careful choice of speed and pressure used during the embossing step. Second the dielectric permittivity should be as high as possible.

Ideally the photopolymer should exhibit little shrinkage, i.e. less than 10% or even 3% in some cases. Shrinkage reduces the amplitude of the embossed copy compared to that of the shim. This can be accounted for by making the grating amplitude larger on the shim. However the degree of shrinkage must be uniform and repeatable over the area of the grating. Shrinkage will also distort the shape of the grating grooves. Again so long as the distortion is uniform and repeatable it can be accounted for by careful design of the shim. Ideally though the shape should be a faithful reproduction of the shim (or carrier film master). Monomers tend to have low viscosity but high shrinkage, conversely oligomers have higher viscosity and lower volume shrinkage. In some instances release from the master grating is aided by some shrinkage.

The required polymerisation speed is relatively low compared to standard reel-to-reel processes. A 14 by 16 inch area of film 1 micron thick can be illuminated for several seconds to achieve cure. Further the photopolymer system may be epoxy, vinyl or acrylate based.

The film also has to survive several solvent washes. Typically the solvents are IPA, acetone and the liquid crystal material.

The electrical switching of the liquid crystal in the device is sensitive to ions leeching from the photopolymer. Ionic content of the photopolymer should be minimised or the photopolymer blend be adapted such that ion leeching can be minimised by suitable post processing such as baking.

EXAMPLE

As an example a ZBD cell was constructed using an alignment layer formed from a photopolymer blend. The photopolymer blend was made with the following constituents:

| | |
|---|---|
| Akzo Nobel Actilane 420 | 66.2% |
| Akzo Nobel Actilane 425 | 28.3% |
| MBF photoinitiator | 0.5% |
| Octadecylacrylate | 5.0% |

The solution was stirred and heated to aid mixing. Meanwhile a master grating surface was made in the following manner:

1. Shipley UVIII was spin coated onto 0.55 mm thick ITO glass to a thickness of 1.0 microns and baked for 60 s at 130° C.
2. The layer was exposed to UV radiation through a chrome on glass mask in hard contact and developed in Shipley CD 26 to reveal a 1 μm pitch grating with the groove troughs fully developed out.
3. The grating was then exposed to DUV (254 nm) to stabilise the grooves followed by a vacuum bake at 170° C. to fully crosslink the resist.
4. The grating was then coated in Asahi Glass Cytop CTX 809A diluted 1:3 in CT Solv 180 (Asahi glass). This film was spin coated at 3000 rpm for 30 seconds in a closed lid spin coater.
5. The substrate was baked at 100° C., 60 seconds on a hotplate followed by 1 hour at 180° C. in an oven to fully cure the Cytop layer which acts as a release layer.

The photopolymer blend was then filtered through a 0.2 μm filter and was applied drop-wise along the edge of a clean piece of ITO coated glass. The master grating was laminated face down on this glass and the pair were compressed between rollers in order to thin down the photopolymer layer.

The photopolymer within the laminate was cured using 2.4 J/cm$^2$ of 365 nm radiation. After curing the laminate was split apart using a razor blade to reveal a replica grating in the cured photopolymer layer. The pressure and speed during the lamination process was adjusted so that the photopolymer thickness from the ITO underlayer to the bottom of the grating grooves was 0.2 μm.

Next the photopolymer replica was baked at 180° C. for 1 hour and then rinsed in isopropanol before being dried at 100° C. for 10 minutes. These extra processes had the effect of further curing the polymer while also reducing the concentration/mobility of ionic content.

A flat region of the photopolymer replica was used to carry out a liquid contact angle study in order to deduce the polymer surface energy. By measuring both water drops and diiodomethane drops, the surface energies were calculated as $\gamma_p$=0.68 J/m$^2$, $\gamma_d$=32.3 J/m$^2$.

The replica grating surface was used to make a 4.5 μm spaced liquid crystal cell by constructing this surface opposite a surface of ITO glass coated with flat layer of JSR JALS 2021 (which gives a monostable perpendicular alignment of the liquid crystal). The cell was then filled with Merck MLC 6204-000 liquid crystal and heated into the isotropic phase to ensure full wetting of the grating surface. Cooling of the cell revealed that the grating surface made of the photopolymer formulation did indeed induce a perpendicular alignment condition of the liquid crystal.

Electrodes were attached to the ITO on each of the cell surfaces to allow electric field to be applied between the plates. Application of alternating bipolar pulses was found to allow bistable switching between the two states (VAN and HAN) which exist on this suitably designed grating surface. FIG. 8 shows the voltage required to switch the cell in between the two bistable states as a function of bipolar pulse width in the manner described in patent GB 2318422.

Thus it can be seen that the blending of appropriate photopolymer components allows a grating to be produced that produces a zenithally bistable cell and allows switching between stables states without requiring any additional surface coatings.

The invention claimed is:

1. A zenithal bistable liquid crystal device having two cell walls comprising:
   an alignment layer on a first cell wall which leads a liquid crystal material in contact with said alignment layer to adopt any one of two stable states which persist in the absence of an applied field, said two stable states being different from one another; and
   a polarizer, adjacent said first cell wall, polarizing light input to said device;
   wherein the alignment layer and the polarizer are configured such that the refractive index of the alignment layer substantially matches the apparent refractive index of the liquid crystal material in the vicinity of said alignment layer for light at normal incidence in both of said two stable states, and said matching condition exists in each of said two stable states whether the respective stable state is a defect state a non-defect state;
   wherein the refractive index of said alignment layer substantially matches the ordinary refractive index of the liquid crystal material.

2. A zenithal bistable liquid crystal device as claimed in claim 1, wherein said alignment layer comprises a grating having a surface profile that varies in one direction and said polarizer polarizes input light perpendicular to said direction of surface profile variation.

3. A zenithal bistable liquid crystal device as claimed in claim 1, wherein the refractive index of said alignment layer is between 1.35 and 1.80.

4. A zenithal bistable liquid crystal device as claimed in claim 1, wherein said alignment layer comprises a polymerized photopolymer bearing a surface profile, and wherein the polymerized photopolymer comprises a cured photopolymer mixture.

5. A zenithal bistable liquid crystal device as claimed in claim 4, wherein said cured photopolymer mixture has a surface energy such that the photopolymer imparts a predetermined orientation of the liquid crystal director with respect to the local surface normal.

6. A zenithal bistable liquid crystal device as claimed in claim 5, wherein the predetermined orientation is a homeotropic orientation.

7. A zenithal bistable liquid crystal device as claimed in claim 4, wherein said cured photopolymer mixture is formed from at least a first short chain polymerizable material and a second short chain polymerizable material.

8. A zenithal bistable liquid crystal device as claimed in claim 7, wherein said first short chain polymerizable material is an oligomer or diluent and said second short chain polymerizable material is a monomer.

9. A zenithal bistable liquid crystal device as claimed in claim 4, wherein said cured photopolymer mixture comprises an immiscible component.

10. A zenithal bistable liquid crystal device as claimed in claim 4, wherein said cured photopolymer mixture is cured in contact with a master containing the inverse of the surface profile, and the cured photopolymer retains this shape after release from the master.

11. A liquid crystal device comprising:
    an alignment layer which leads a liquid crystal material in contact with said alignment layer to adopt any one of at least two stable states which persist in the absence of an applied field, said two stable states being different from one another;
    a polarizer, adjacent to said alignment layer, polarizing light input to said device in a first polarization direction;
    wherein the alignment layer and the polarizer are configured such that the apparent refractive index of the liquid crystal material in the vicinity of said alignment layer in said first polarization direction is the same in each of said stable states and substantially matches the refractive index of said alignment layer and said matching condition exists in each of said two stable state whether respective stable state is a defect state or non-defect state;
    wherein the refractive index of said alignment layer substantially matches the ordinary refractive index of the liquid crystal material.

12. A zenithal bistable liquid crystal device comprising:
    an alignment layer which leads a liquid crystal material in contact with said layer to adopt any one of two stable states which persist in the absence of an applied field, said two stable states having different liquid crystal molecular orientations from one another; and
    a polariser, adjacent to said alignment layer, for polarising light input to said device;
    wherein the device is configured such that the alignment layer is optically buried in both of said two stable states of the liquid, crystal material and said optically buried condition exists in each of said two stable states whether the respective stable state is a defect state or a non-defect state; and
    wherein the refractive index of said alignment layer substantially matches the ordinary refractive index of the liquid crystal material.

* * * * *